United States Patent
de Almeida et al.

(10) Patent No.: US 11,312,336 B2
(45) Date of Patent: Apr. 26, 2022

(54) METHODS OF OPERATING A REAR WIPER SYSTEM AND A FULL DISPLAY MIRROR SYSTEM OF A VEHICLE

(71) Applicant: Honda Motor Co., Ltd., Tokyo (JP)

(72) Inventors: Erik F. de Almeida, Dublin, OH (US); Douglas R. Kaltenmark, Powell, OH (US); Osamu Tsurumiya, Shimotsuke (JP)

(73) Assignee: HONDA MOTOR CO., LTD., Tokyo (JP)

(*) Notice: Subject to any disclaimer, the term of this patent is extended or adjusted under 35 U.S.C. 154(b) by 306 days.

(21) Appl. No.: 16/368,129

(22) Filed: Mar. 28, 2019

(65) Prior Publication Data

US 2019/0337487 A1 Nov. 7, 2019

Related U.S. Application Data

(60) Provisional application No. 62/665,931, filed on May 2, 2018.

(51) Int. Cl.
| | |
|---|---|
| *B60S 1/08* | (2006.01) |
| *B60Q 9/00* | (2006.01) |
| *B60R 1/00* | (2022.01) |
| *B60R 1/12* | (2006.01) |
| *G06T 11/60* | (2006.01) |
| *B60R 1/04* | (2006.01) |
| *B60S 1/04* | (2006.01) |

(52) U.S. Cl.
CPC .............. *B60S 1/0803* (2013.01); *B60Q 9/00* (2013.01); *B60R 1/00* (2013.01); *B60R 1/12* (2013.01); *G06T 11/60* (2013.01); *B60R 1/04* (2013.01); *B60R 2001/1215* (2013.01); *B60S 1/04* (2013.01)

(58) Field of Classification Search
CPC . B60S 1/0803; B60S 1/04; B60Q 9/00; B60R 1/00; B60R 1/12; B60R 2001/1215; B60R 1/04; B60R 2300/207; B60R 2300/8026; G06T 11/60
USPC .......................................................... 701/36
See application file for complete search history.

(56) References Cited

U.S. PATENT DOCUMENTS

| | | | |
|---|---|---|---|
| 4,999,550 A * | 3/1991 | Jones ........................ | B60S 1/08 15/250.17 |
| 5,956,181 A | 9/1999 | Lin | |
| 6,247,201 B1 * | 6/2001 | McCray .................... | B60S 1/38 15/250.19 |
| 7,230,523 B2 | 6/2007 | Harter, Jr. et al. | |
| 7,855,755 B2 | 12/2010 | Weller et al. | |
| 7,933,699 B2 | 4/2011 | Hara et al. | |
| 8,339,526 B2 | 12/2012 | Minikey, Jr. et al. | |

(Continued)

FOREIGN PATENT DOCUMENTS

| | | | | |
|---|---|---|---|---|
| CN | 206254902 U | | 6/2017 | |
| EP | 1679229 A2 * | | 7/2006 | ............... B60R 1/00 |

(Continued)

*Primary Examiner* — Jonathan M Dager
*Assistant Examiner* — Jean W Charleston
(74) *Attorney, Agent, or Firm* — Armstrong Teasdale LLP

(57) ABSTRACT

A method of operating a rear wiper system of a vehicle that includes monitoring an operational status of a full display mirror system of the vehicle, and automatically activating the rear wiper system when the full display mirror system is switched from an active mode to an inactive mode.

20 Claims, 4 Drawing Sheets

(56) References Cited

U.S. PATENT DOCUMENTS

| | | |
|---|---|---|
| 8,983,721 B2 | 3/2015 | Petridis et al. |
| 9,290,160 B2 | 3/2016 | Davies |
| 9,406,232 B2 | 8/2016 | Kataoka |
| 9,538,073 B2 | 1/2017 | Kim |
| 9,809,171 B2 | 11/2017 | Weller et al. |
| 9,969,357 B1 * | 5/2018 | Carlesimo .............. B60K 37/06 |
| 2002/0039238 A1 * | 4/2002 | Chang .................... B60R 1/084 |
| | | 359/603 |
| 2002/0113873 A1 | 8/2002 | Williams |
| 2008/0258896 A1 | 10/2008 | Stoller et al. |
| 2012/0117745 A1 * | 5/2012 | Hattori ..................... B60S 1/54 |
| | | 15/250.01 |
| 2015/0066293 A1 * | 3/2015 | Davies ................... B60S 1/583 |
| | | 701/36 |
| 2016/0016536 A1 * | 1/2016 | Merwald ............... B60S 1/0818 |
| | | 701/36 |
| 2017/0008494 A1 * | 1/2017 | Gerwatowski .......... B60S 1/349 |
| 2017/0361811 A1 * | 12/2017 | Carlesimo ............. B60S 1/482 |
| 2018/0077330 A1 * | 3/2018 | Kato ........................ H04N 7/18 |
| 2019/0210571 A1 * | 7/2019 | Ghannam ............. B60S 1/0818 |

FOREIGN PATENT DOCUMENTS

| | | |
|---|---|---|
| JP | 2003025970 A | 1/2003 |
| WO | 2014175806 A1 | 10/2014 |

* cited by examiner

METHODS OF OPERATING A REAR WIPER SYSTEM AND A FULL DISPLAY MIRROR SYSTEM OF A VEHICLE

CROSS-REFERENCE TO RELATED APPLICATION

This application claims priority to U.S. Provisional Application No. 62/665,931 filed May 2, 2018, which is hereby incorporated by reference in its entirety.

BACKGROUND

The present disclosure relates generally to full display mirrors for use in motor vehicles and, more specifically, to a control scheme for use in facilitating interactive cooperation between a full display mirror system and a rear wiper system in a motor vehicle.

Rearview mirrors have long been used to provide a vehicle operator with a reflected view of an area behind the operator while the operator remains facing forward. This area behind the operator includes portions of the interior of the vehicle as well as an area outside of the vehicle as seen through the rear window. At least some known vehicles also include a rearview camera and video display that facilitate providing an operator of the vehicle with an unobstructed view rearward from the vehicle. Typically, the rearview camera and video display may only be activated when the vehicle is in a predetermined operational mode, such as when the vehicle is set to operate in reverse. The operator relies on other means, such as a rearview mirror, to provide the operator with visibility rearward of the vehicle when the vehicle is set to operate in other operational modes. However, cargo loaded in the rear of the vehicle or passengers occupying the rear seats may interfere with the operator's ability to see out of the rear window using the rearview mirror.

As such, at least some known vehicles include a full display mirror system installed therein. Known full display mirror systems provide a video feed from the rearview camera to a display incorporated in the rearview mirror of the vehicle regardless of the current operational mode of the vehicle. Some known full display mirror systems provide the operator with the capability to switch between a view provided by the rearview camera (i.e., the operator views an output of the display) and a view provided by a traditional rearview mirror (i.e., the operator views a reflection in the mirror). The vehicle may also include a rear wiper system that is operable independently of the full display mirror system. Because the rearview camera is typically mounted to an exterior of the vehicle, it does not provide a rearward view through the rear window of the vehicle, and as such the operator of the vehicle may not notice that the rear wiper system is active if the operator relies solely on the rearward view provided by the full display mirror system. Unintentional activation of the rear wiper system may reduce the service life of the rear wiper blade.

BRIEF DESCRIPTION

In one aspect, a method of operating a rear wiper system of a vehicle is provided. The method includes monitoring an operational status of a full display mirror system of the vehicle, and automatically activating the rear wiper system when the full display mirror system is switched from an active mode to an inactive mode.

In another aspect, a vehicle is provided. The vehicle includes a full display mirror system, a rear wiper system, and a control unit in communication with the full display mirror system and the rear wiper system. The control unit is configured to monitor an operational status of the full display mirror system, and to automatically activate the rear wiper system when the full display mirror system is switched from an active mode to an inactive mode.

In yet another aspect, a method of operating a rear wiper system of a motor vehicle is provided. The method includes determining an operational status of a full display mirror system of the motor vehicle, and deactivating the rear wiper system when the full display mirror system is in an active mode.

DETAILED DESCRIPTION

The embodiments described herein relate generally to a control scheme for use in facilitating interactive cooperation between a full display mirror (FDM) system and a rear wiper system. More specifically, embodiments described herein are intended for use with large vehicles, such as sport utility vehicles or minivans, that include an FDM system, and/or smaller vehicles that also include relatively vertical and/or large rear windows. In the exemplary embodiment, the vehicles include a rear windshield wiper and windshield washer fluid nozzle. Since the rearview camera of the FDM system is coupled to the exterior of the vehicle, if the rear wiper is ON, even if unintentionally ON, the driver would not see it operating in a rearview display of the FDM system when the FDM system is turned ON. If the rearview window is dry, unintentional prolonged use of the rear windshield wiper on a dry window may cause the wiper blade to prematurely wear, thus prematurely reducing its useful life.

In some embodiments described herein, use of the video feed within the FDM system is optional. That is, the FDM system includes a reflective layer such that it can be used in the same manner as a traditional rearview mirror. Thus, the video display of the FDM system needs to be activated in order to use the video display. As referred to hereinafter, when the FDM system is in an active mode, which is also referred to herein as activated, turned ON, or enabled, the vehicle operator sees images from the camera on the video display. Conversely, when the FDM system is in an inactive mode, which is also referred to herein as deactivated, turned OFF, or disabled, the vehicle operator sees reflected images.

Moreover, in some embodiments, the FDM system includes a washer nozzle used to keep the rearview camera clean. In the exemplary embodiment, the FDM washer nozzle is activated by the same switch used to activate the rear window washer nozzle (e.g., the rear wiper switch options are ON, INT (intermittent), OFF, and WASH). The WASH selection on the switch is a momentary switch, in that the switch must be held in the WASH selection position to be activated.

One embodiment of the present disclosure provides a control system that, if the FDM system is ON, only permits operation of the rear windshield wiper when a rear windshield/camera washing operation is requested (i.e., when the switch is held in the WASH selection position and for a predetermined amount of time after the switch is released). Put another way, the rear windshield wiper is prevented from operating when the rear wiper switch is in the ON or INT position and the FDM system is enabled. The FDM system is configured in this manner because the rear windshield wiper is used to clear the rear window to enable the driver to see through it when using a reflective rearview mirror, and because the rear window does not need to be clean for the driver to have an unimpeded view when the FDM system is ON.

Figure 1:
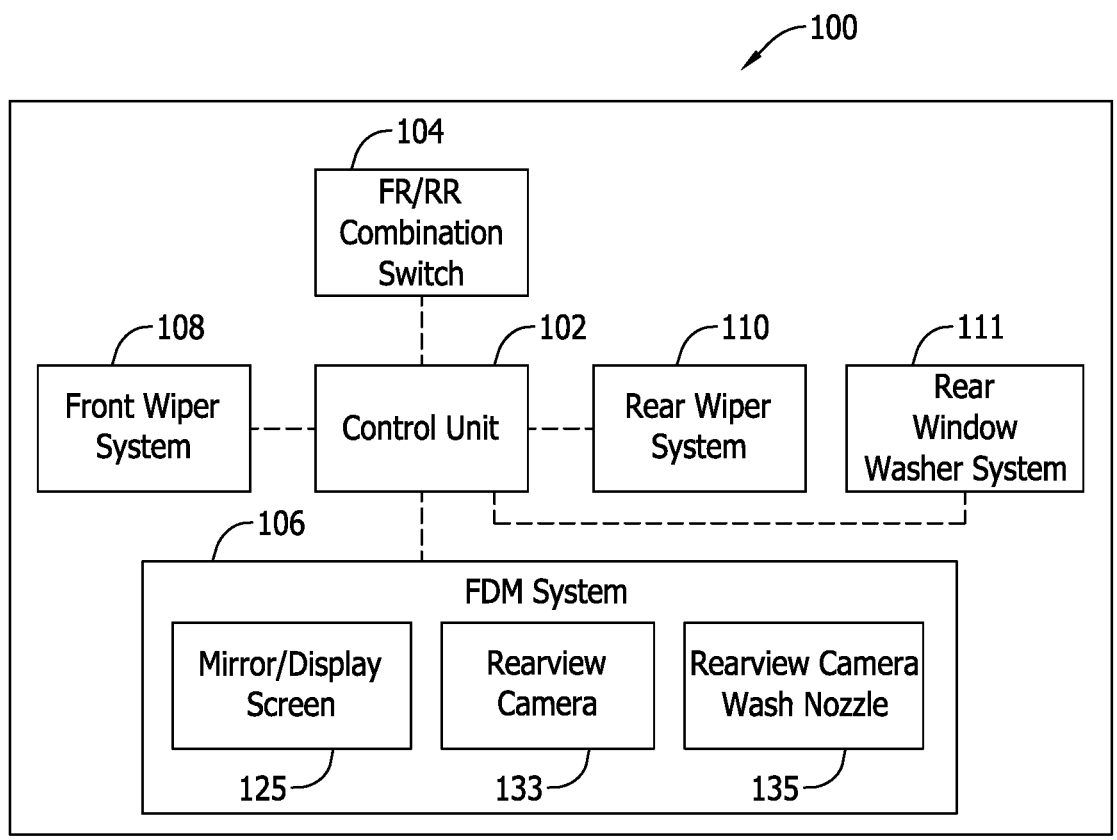
FIG. 1 is a box diagram illustrating an exemplary motor vehicle.

One embodiment of the present disclosure provides a control system that provides a "courtesy wipe" of the rearview window. The courtesy wipe functionality may be implemented along with the rear wiper activation control system described above. In the exemplary embodiment, the courtesy wipe function is executed automatically when the driver switches the FDM system from ON to OFF (i.e., when the driver switches from the FDM system display to the traditional reflective rearview mirror display). The courtesy wipe function automatically activates the rear windshield wiper when the FDM system is switched from ON to OFF and either the front or rear wiper switch is in an active position (e.g., ON or INT). As such, the rear windshield wiper is activated momentarily to remove any obstructions from the rear windshield that were not visible when the FDM system was activated, and thus provides the driver with a clear rearward view via the reflective rearview display and through the rear windshield FIG. 1 is a box diagram illustrating select components within an exemplary motor vehicle 100. In the exemplary embodiment, motor vehicle 100 includes a control unit 102, a combination front and rear wiper system switch 104, and a full display mirror (FDM) system 106. Alternatively, motor vehicle 100 may include a front wiper switch and a separate rear wiper switch. Motor vehicle 100 also includes a front wiper system 108, a rear wiper system 110, and a rear window washer system 111. In the exemplary embodiment, FDM system 106 includes a combination mirror/display screen 125, a rearview camera 133, and a rearview camera wash nozzle 135. Control unit 102 is coupled in communication with switch 104, FDM system 106, front wiper system 108, rear wiper system 110, and rear window washer system 111. Control unit 102 controls operation of systems 108, 110, and 111 and, in some embodiments, facilitates controlling the operation based on commands received from switch 104 and/or FDM system 106. Control unit 102 also stores control algorithms therein, such as those described in more detail below. Although illustrated as a single box, functions of control unit 102 may be performed by a single controller and/or processor, or may be separated between multiple controllers and/or processors.

Figure 2:
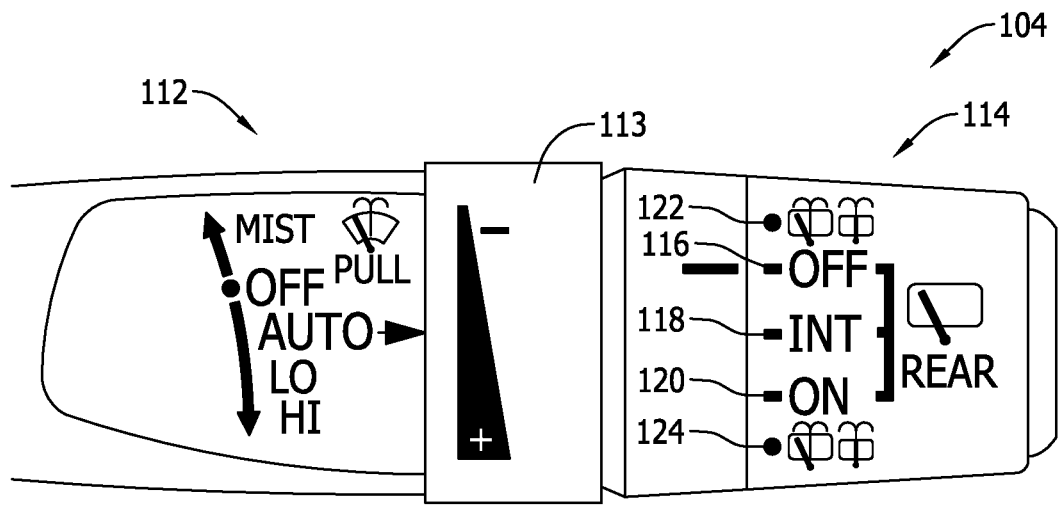
FIG. 2 is an exemplary combination front and rear wiper system switch that may be used with the control system shown in FIG. 1.

FIG. 2 is an exemplary embodiment of front and rear wiper system switch 104. In the exemplary embodiment, switch 104 includes a front wiper toggle 112 and a rear wiper toggle 114. Front wiper toggle 112 controls operation of front wiper system 108 (shown in FIG. 1), and rear wiper toggle 114 controls operation of rear wiper system 110 and rear window washer system 111 (both shown in FIG. 1). In the exemplary embodiment, front wiper toggle 112 is selectively positionable between a MIST position, an OFF position, an AUTO position, a LO position, and a HI position. Front wiper toggle 112 includes a wiper interval selector 113 that is rotatable relative to switch 104. Wiper interval selector 113 is operable when front wiper toggle 112 is in the AUTO position, which facilitates activating front wiper system 108 in an automatic mode. Wiper interval selector 113 enables a driver of motor vehicle 100 (shown in FIG. 1) to adjust a front wiper activation interval of front wiper system 108. In addition, positioning front wiper toggle 112 in the LO position facilitates activating front wiper system 108 in a low speed mode, and positioning front wiper toggle 112 in the HI position facilitates activating front wiper system 108 in a high speed mode. The low speed mode has a shorter front wiper activation interval than the automatic mode, and the high speed mode has a shorter front wiper activation interval than the low speed mode.

Rear wiper toggle 114 is rotatable between a plurality of perpetual switches and at least one momentary switch. The perpetual switches remain in their set position unless biased by a driver into a different position. The momentary switch must be held in a selected position for a predetermined amount of time for the switch functionality to be maintained. The perpetual switches include an OFF switch 116, an INT switch 118, and an ON switch 120, such that rear wiper toggle 114 is selectively positionable between an OFF position, an INT position, and an ON position. Similar to front wiper system 108, activation of rear wiper system 110 (shown in FIG. 1) is defined by a rear wiper activation interval. Positioning rear wiper toggle 114 in the INT position facilitates activating rear wiper system 110 in an intermittent mode, and positioning rear wiper toggle 114 in the ON position facilitates activating rear wiper toggle 114 in an ON mode. The ON mode has a shorter rear wiper activation interval than the intermittent mode. The at least one momentary switch includes a first WASH switch 122 that is adjacent to OFF switch 116, and a second WASH switch 124 that is adjacent to ON switch 120. First and second WASH switches 122 and 124 facilitate activating rearview window washer system 111.

Figure 3:
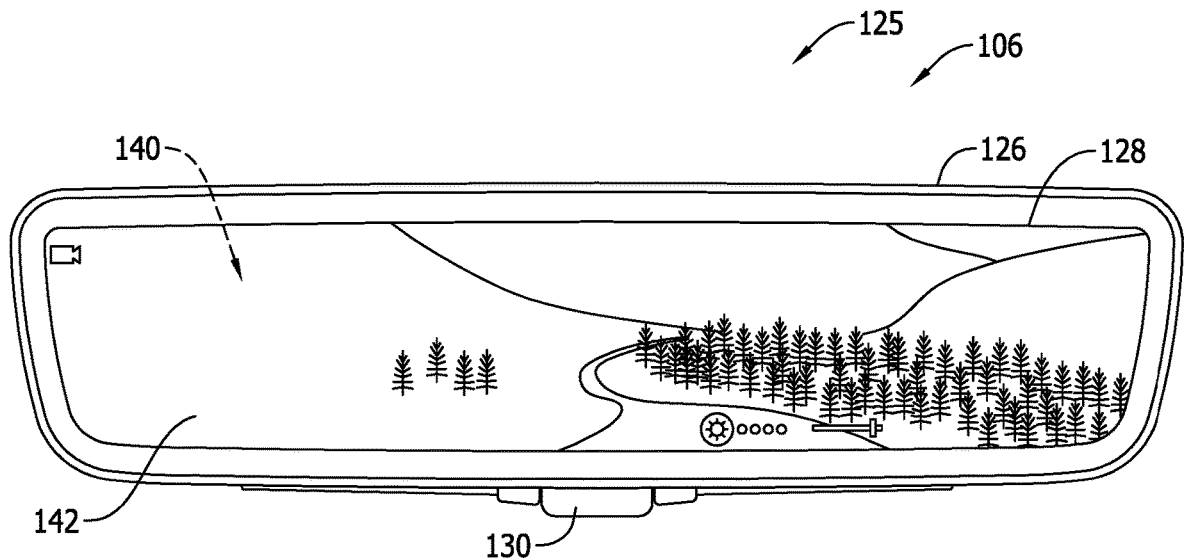
FIG. 3 is an exemplary display of a full display mirror system that may be used with the control system shown in FIG. 1.

FIG. 3 is a front view of an exemplary embodiment of mirror/display screen 125 of FDM system 106 in an active mode. In the exemplary embodiment, mirror/display screen 125 is included within vehicle 100 in the same position/orientation as a typical rearview mirror. For example, mirror/display screen 125 may be coupled to and extending from a top portion of a vehicle windshield, a vehicle headliner, and/or in any other position/orientation that allows FDM system 106 to function as described herein.

Mirror/display screen 125 includes a housing 126, a display window 128 within housing 126, and an FDM switch 130 coupled to housing 126. Mirror/display screen 125 also includes a display screen 140 positioned behind a mirrored layer 142. In other words, the mirrored layer 142 is positioned between the user and the display screen 140 such that, when FDM system 106 is in the active mode, images from the display screen 140 pass through the mirrored layer 142 before viewed by the user. Display screen 140 may include, but is not limited to, a liquid-crystal display (LCD), a light-emitting diode (LED) based display, an organic light-emitting diode (OLED) based display, and/ or any other type of video display that allows FDM system 106 to function as described herein.

The mirror/display screen 125 is configured such that when the FDM system 106 is in the active mode, the user sees a video feed provided by rearview camera 133 and displayed on display screen 140 within display window 128. When FDM system 106 is in the inactive mode, the user sees images reflected from mirrored layer 142 within display window 128. The transition between viewing an image displayed on display screen 140 and an image reflected from mirrored layer 142 may involve physically moving mirror/display screen 125, for example, by tilting mirror/display screen 125 up or down. FDM switch 130 enables a driver to selectively switch between the active mode and an inactive mode of FDM system 106. FDM switch 130 may be a toggle switch, a button, and/or any other type of switch able to provide an electrical signal to control unit 102 indicating a desire to activate (i.e., turn ON) or deactivate (i.e., turn OFF) display screen 140. FDM switch 130 may also physically tilt mirror/display screen 125, or cause mirror/display screen 125 to tilt, between a first and a second position.

Figure 4:
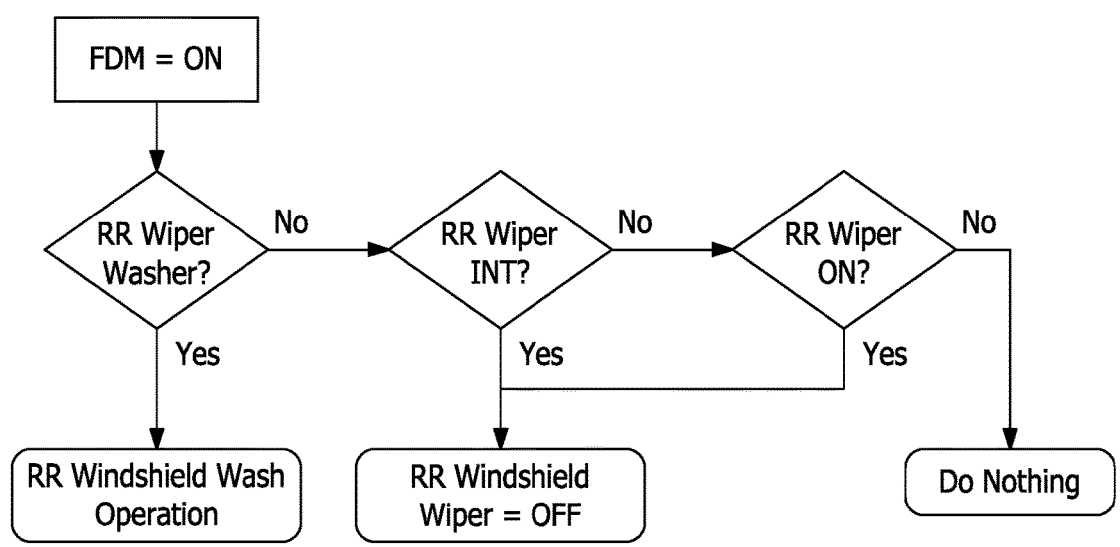
FIG. 4 is an exemplary control diagram illustrating a first method of operating a rear wiper system of a motor vehicle, such as the motor vehicle shown in FIG. 1.

FIG. 4 is an exemplary control diagram illustrating a first method of operating rear wiper system 110 (shown in FIG. 1). In the exemplary embodiment, FDM system 106 is in an active mode and the control diagram illustrates what occurs when rear wiper system 110 is in different modes of operation. For example, when rear wiper toggle 114 is positioned to activate either first WASH switch 122 or second WASH switch 124 (both shown in FIG. 2), control unit 102 causes rearview window washer system 111 to operate normally regardless of the operational status of FDM system 106. In addition, when FDM system 106 is in the active mode, control unit 102 deactivates rear wiper system 110. In other words, even if rear wiper toggle 114 is in a position that would typically cause control unit 102 to activate the rear wiper system 110 (i.e., either in INT or ON), control system 102 will deactivate rear wiper system 110 if FDM system 106 is in the active mode. In one embodiment, deactivation of rear wiper system 110 includes automatically deactivating rear wiper system 110 from an active mode (e.g., rear wiper toggle 114 positioned at INT or ON) when FDM system 106 is in the active mode. Alternatively, deactivation of rear wiper system 110 includes preventing rear wiper system 110 from switching from an inactive mode (i.e., rear wiper toggle 114 positioned at OFF) to the active mode when FDM system 106 is in the active mode.

Figure 5:
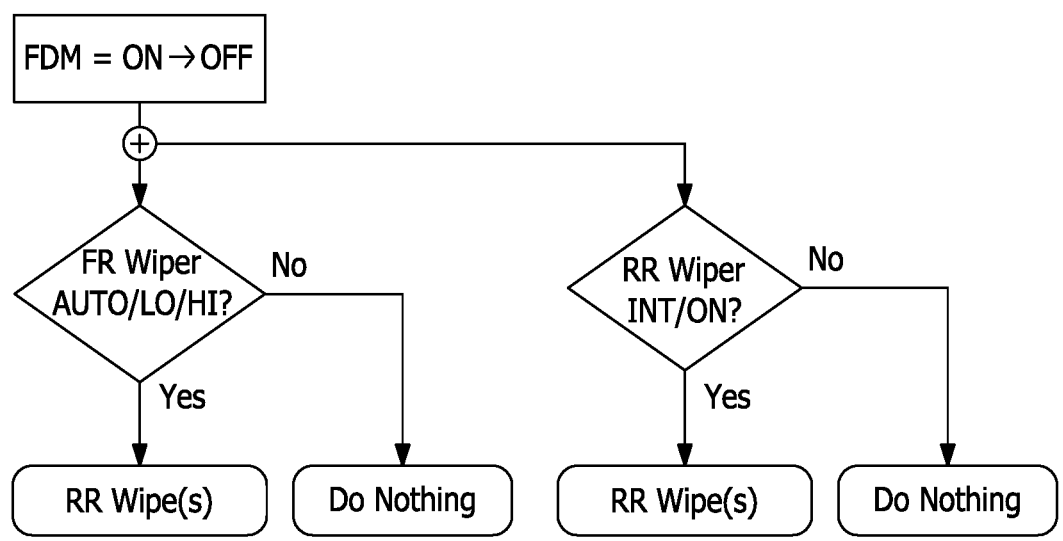
FIG. 5 is an exemplary control diagram illustrating a second method of operating the rear wiper system of the motor vehicle.

FIG. 5 is an exemplary control diagram illustrating a second method of operating rear wiper system 110 (shown in FIG. 1). In the exemplary embodiment, FDM system 106 is switched from an active mode to an inactive mode. If either front wiper toggle 112 or rear wiper toggle 114 (both shown in FIG. 2) are in an active mode (e.g., the automatic, low, or high modes for front wiper system 108, or the intermittent or on modes for rear wiper system 110) when FDM system 106 is switched from the active mode to the inactive mode, then control unit 102 automatically activates rear wiper system 110. For example, in one embodiment, control unit 102 automatically activates rear wiper system 110 to perform a single rear wiper activation. Alternatively, control unit 102 may activate rear wiper system 110 to provide two wiper passes, or any other predefined number of passes that provides a desired clearing of the rear window.

In addition, as noted above, rear wiper system 110 is defined by a rear wiper activation interval. In the exemplary embodiment, automatically activating rear wiper system 110 includes activating rear wiper system 110 is before a next scheduled wiper activation in the rear wiper activation interval. That is, the current operating mode of rear wiper system 110 is overridden when FDM system 106 is switched from the active mode to the inactive mode. As such, the rearview window of motor vehicle 100 is instantly cleared without having to wait for the next scheduled wiper activation.

If either front wiper toggle 112 or rear wiper toggle 114 are positioned in an ON position, it is likely that the rearview window of motor vehicle 100 may be at least partially obstructed. As such, automatically activating rear wiper system 110 facilitates providing the driver of motor vehicle 100 with an unobstructed rearward view without the need for additional driver intervention. Moreover, control unit 102 does not activate rear wiper system 110 if either front wiper system 108 or rear wiper system 110 are inactive, and FDM system 106 is switched from the active mode to the inactive mode.

Figure 6:
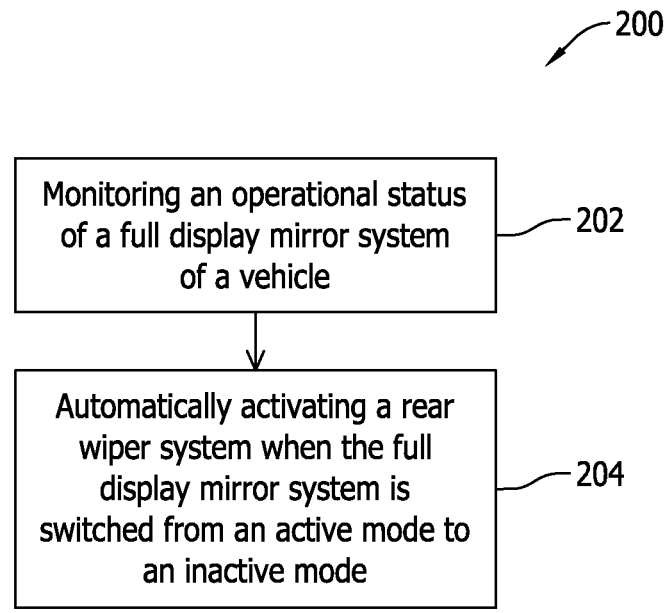
FIG. 6 is a flow diagram illustrating a first method of operating a rear wiper system of a motor vehicle.

FIG. 6 is a flow diagram illustrating a first method 200 of operating rear wiper system 110 (shown in FIG. 1). Method 200 includes monitoring 202, such as with control unit 102 (shown in FIG. 1), an operational status of a full display mirror system of a vehicle, and automatically activating 204 a rear wiper system of the vehicle when the full display mirror system is switched from an active mode to an inactive mode.

Figure 7:
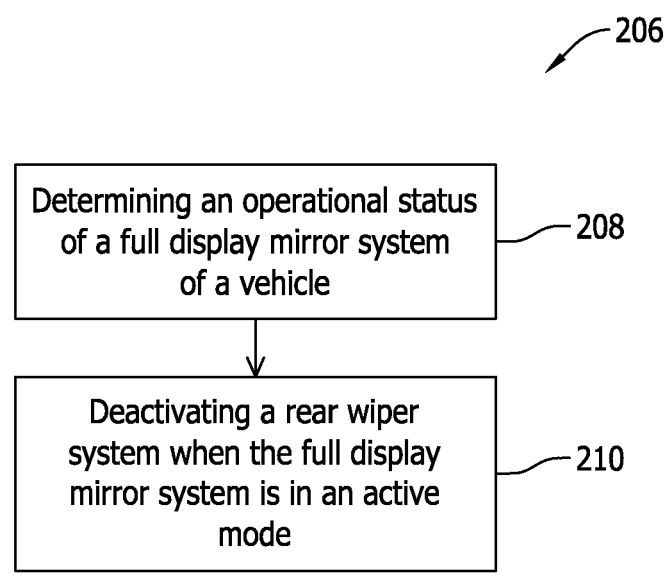
FIG. 7 is a flow diagram illustrating a second method of operating a rear wiper system of a motor vehicle.

FIG. 7 is a flow diagram illustrating a second method 206 of operating rear wiper system 110 (shown in FIG. 1). Method 206 includes monitoring 208 an operational status of a full display mirror system of a vehicle, and deactivating 210 a rear wiper system of the vehicle when the full display mirror system is in an active mode.

The embodiments described herein relate to a control scheme for use with a full display mirror system and a rear wiper system of a vehicle that facilitates reducing unnecessary wear to wiper components of rear wiper system, and that enables automatically providing a driver of the motor vehicle with an unobstructed rearward view even when the FDM system is not in use. The control schemes described herein reduce unnecessary wear to the wiper components by preventing operation of the rear wiper system under certain operating conditions of the vehicle. As such, the useful service life of the wiper components is increased.

Exemplary embodiments of a full display mirror (FDM) system and a rear wiper system are described above in detail. Although the systems herein described and illustrated in association with a motor vehicle, the invention is also intended for use on any means of conveyance including an FDM system and a rear wiper system. Moreover, it should also be noted that the components of the invention are not limited to the specific embodiments described herein, but rather, aspects of each component may be utilized independently and separately from other components and methods of assembly described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a rear wiper system of a vehicle, said method comprising:
    monitoring, by a control unit onboard the vehicle, an operational status of a full display mirror system of the vehicle, wherein the full display mirror system displays a video feed received from a rearview camera on the vehicle; and
    automatically activating, with the control unit, the rear wiper system in response to the full display mirror system being switched from an active mode, in which the video feed is displayed on the full display mirror system, to an inactive mode, in which the video feed is not displayed on the full display mirror system.

2. The method in accordance with claim 1, wherein automatically activating the rear wiper system comprises automatically activating the rear wiper system if a front wiper system of the vehicle is in an active mode when the full display mirror system is switched from the active mode to the inactive mode.

3. The method in accordance with claim 2 further comprising monitoring an operational status of the front wiper system, wherein the active mode of the front wiper system is defined by an automatic mode, a low mode, and a high mode.

4. The method in accordance claim 1, wherein automatically activating the rear wiper system comprises automatically activating the rear wiper system if the rear wiper system is in an active mode when the full display mirror system is switched from the active mode to the inactive mode.

5. The method in accordance with claim 4 further comprising monitoring an operational status of the rear wiper system, wherein the active mode of the rear wiper system is defined by an intermittent mode and an on mode.

6. The method in accordance with claim 4, wherein the active mode of the rear wiper system is defined by a rear wiper activation interval, wherein automatically activating the rear wiper system comprises activating the rear wiper system before a next scheduled wiper activation in the rear wiper activation interval.

7. The method in accordance with claim 1, wherein automatically activating the rear wiper system comprises performing a single wiper activation.

8. The method in accordance with claim 1, wherein the full display mirror system is incorporated in a rearview mirror of the vehicle, the method further comprising providing a reflective view from the rearview mirror when the full display mirror system is switched from the active mode to the inactive mode.

9. A vehicle comprising:
    a full display mirror system;
    a rearview camera configured to provide a video feed to the full display mirror system;
    a rear wiper system; and
    a control unit in communication with said full display mirror system and said rear wiper system, said control unit configured to:
        monitor an operational status of said full display mirror system; and
        automatically activate said rear wiper system in response to said full display mirror system being switched from an active mode, in which the video feed is displayed on the full display mirror system, to an inactive mode, in which the video feed is not displayed on the full display mirror system.

10. The vehicle in accordance with claim 9 further comprising a front wiper system, wherein said control unit is further configured to automatically activate said rear wiper system if said front wiper system is in an active mode when said full display mirror system is switched from the active mode to the inactive mode.

11. The vehicle in accordance with claim 10, wherein said control unit is further configured to monitor an operational status of said front wiper system, wherein the active mode of said front wiper system is defined by an automatic mode, a low mode, and a high mode.

12. The vehicle in accordance with claim 9, wherein said control unit is further configured to automatically activate said rear wiper system if said rear wiper system is in an active mode when said full display mirror system is switched from the active mode to the inactive mode.

13. The vehicle in accordance with claim 12, wherein the active mode of the rear wiper system is defined by a rear wiper activation interval, said control unit further configured to automatically activate the rear wiper system before a next scheduled wiper activation in the rear wiper activation interval.

14. The vehicle in accordance with claim 9, wherein said control unit is further configured to deactivate said rear wiper system when said full display mirror system is in an active mode.

15. The vehicle in accordance with claim 14 wherein said control unit is further configured to automatically deactivate said rear wiper system from an active mode when said full display mirror system is in the active mode.

16. The vehicle in accordance with claim 14 wherein said control unit is further configured to prevent said rear wiper system from switching from an inactive mode to an active mode when said full display mirror system is in the active mode.

17. A method of operating a rear wiper system of a vehicle, said method comprising:
    determining, by a control unit onboard the vehicle, an operational status of a full display mirror system of the vehicle; and
    deactivating, with the control unit, the rear wiper system when the full display mirror system is in an active mode.

18. The method in accordance with claim 17, wherein deactivating the rear wiper system comprises automatically deactivating the rear wiper system from an active mode when the full display mirror system is in the active mode.

19. The method in accordance with claim 17, wherein deactivating the rear wiper system comprises preventing the rear wiper system from switching from an inactive mode to an active mode when the full display mirror system is in the active mode.

20. The method in accordance with claim 17 further comprising causing a rearview window washer system of the vehicle to operate normally regardless of the operational status of the full display mirror system.

* * * * *